G. W. & J. L. VOELKEL.
CLOD CUTTER.
APPLICATION FILED FEB. 28, 1908. RENEWED JUNE 3, 1909.

928,088.

Patented July 13, 1909.

Witnesses
Frank B. Hoffman
K. Allen

Inventors
George W. Voelkel and
John L. Voelkel
By Victor J. Evans
Attorney

UNITED STATES PATENT OFFICE.

GEORGE W. VOELKEL AND JOHN L. VOELKEL, OF BEAUCOUP, ILLINOIS.

CLOD-CUTTER.

No. 928,088.            Specification of Letters Patent.            Patented July 13, 1909.

Application filed February 28, 1908, Serial No. 418,398. Renewed June 3, 1909. Serial No. 499,996.

*To all whom it may concern:*

Be it known that we, GEORGE W. VOELKEL and JOHN L. VOELKEL, citizens of the United States, residing at Beaucoup, in the county of Washington and State of Illinois, have invented new and useful Improvements in Clod-Cutters, of which the following is a specification.

This invention relates to clod cutters. The object of the invention is to provide a simple, cheap and effective device of this character comprising a series of circular knives mounted upon a suitable frame, provided with suitable fenders positioned between the knives, whereby the earth raised by the knife is removed, thus leaving the working faces clear.

With these and other objects in view the invention resides in the novel construction of elements in operative combination, hereinafter fully described.

Figure 1:
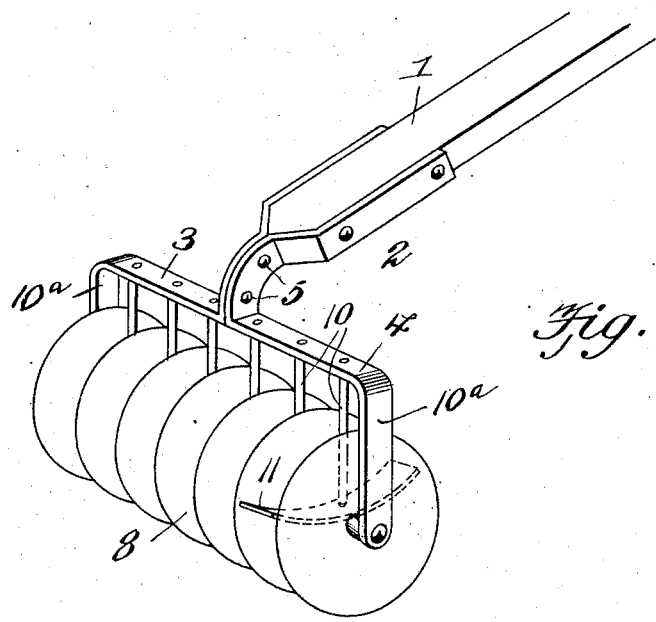
Figure 2:
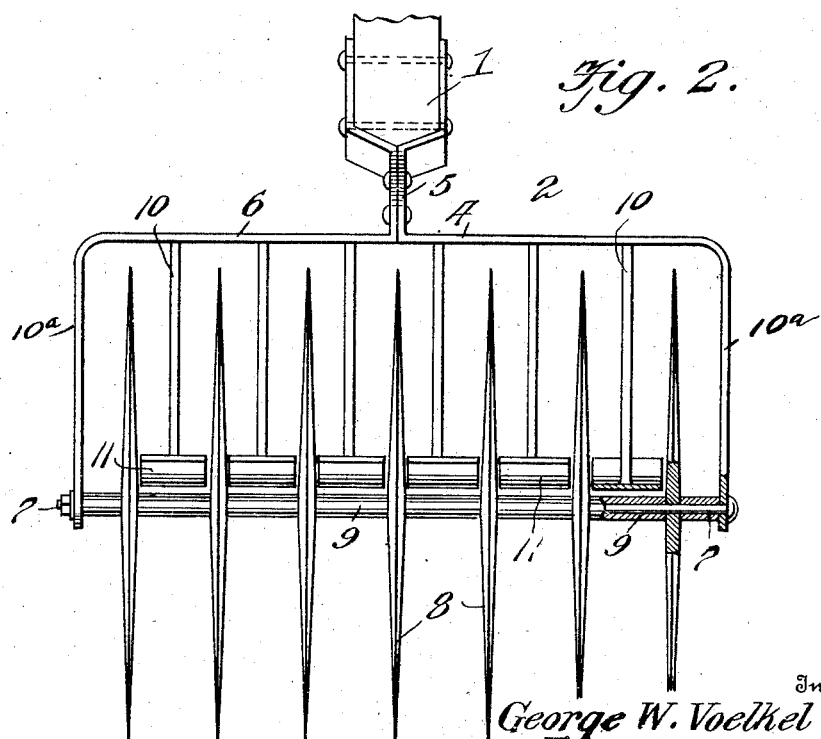

In the drawings, Figure 1 is a perspective view of a device constructed in accordance with my invention. Fig. 2 is a top plan view of the same.

In the drawings, the numeral 1 designates the handle of our improved clod cutter. As illustrated in the drawings the handle 1 is preferably rectangular in cross section, and secured upon two of the faces of the handle is the frame 2 of my device. This frame 2 is constructed of suitable metallic strips, comprising a pair of sections 3 and 4. The sections 3 and 4 are secured together by suitable bolts 5, at a point in rear of their engagement with the handle 1. The members comprising the frame are then bent at a right angle in opposite directions from each other to provide the longitudinal portion 6 of the frame. The members are bent and continued downwardly at a substantially right angle to provide arms $10^a$, and the extremities of these arms are provided with suitable openings adapted for the reception of an axle 7. Mounted upon the axle 7 are a plurality of circular knives 8, suitably spaced away from each other, and from the right angular members of the frame by suitable hollow bushings 9. The knives 8 are provided with a cutting edge and have convex faces upon either side of the cutting edge. The longitudinal members of the frame are provided with a series of apertures, positioned upon the frame centrally between the circular knives 8. These apertures are adapted for the reception of suitable arms 10 adapted to extend downwardly toward center of axle 7. The free ends of the arms 10 are provided with arcuate shields or fenders 11. These fenders 11 are of a width slightly lesser than the distance between the spaced circular knives 8, and are adapted to contact with the dirt or soil raised by the knives, and deposit the dirt in the rear of the axle, thus leaving the front or cutting edge of the knives free to contact with the earth.

Having thus fully described the invention what is claimed as new is:

In a clod cutter, the combination with a frame formed from metallic strips secured together, a handle engaged with the said strips, said strips having portions thereof bent in opposite directions from each other and provided with angularly disposed arms, of an axle mounted at its ends in the said arms, a plurality of cutting knives revolubly mounted upon the axle, spacing sleeves between the said knives, arms carried by the frame and extending between the knives, and fenders of concavo-convex form carried by the arm and disposed so that portions thereof are curved upwardly away from the axle at each side thereof.

In testimony whereof we affix our signatures in presence of two witnesses.

GEORGE W. VOELKEL.
           JOHN. L. VOELKEL.

Witnesses:
   H. F. HECKERT,
   SAM MULLER.